UNITED STATES PATENT OFFICE.

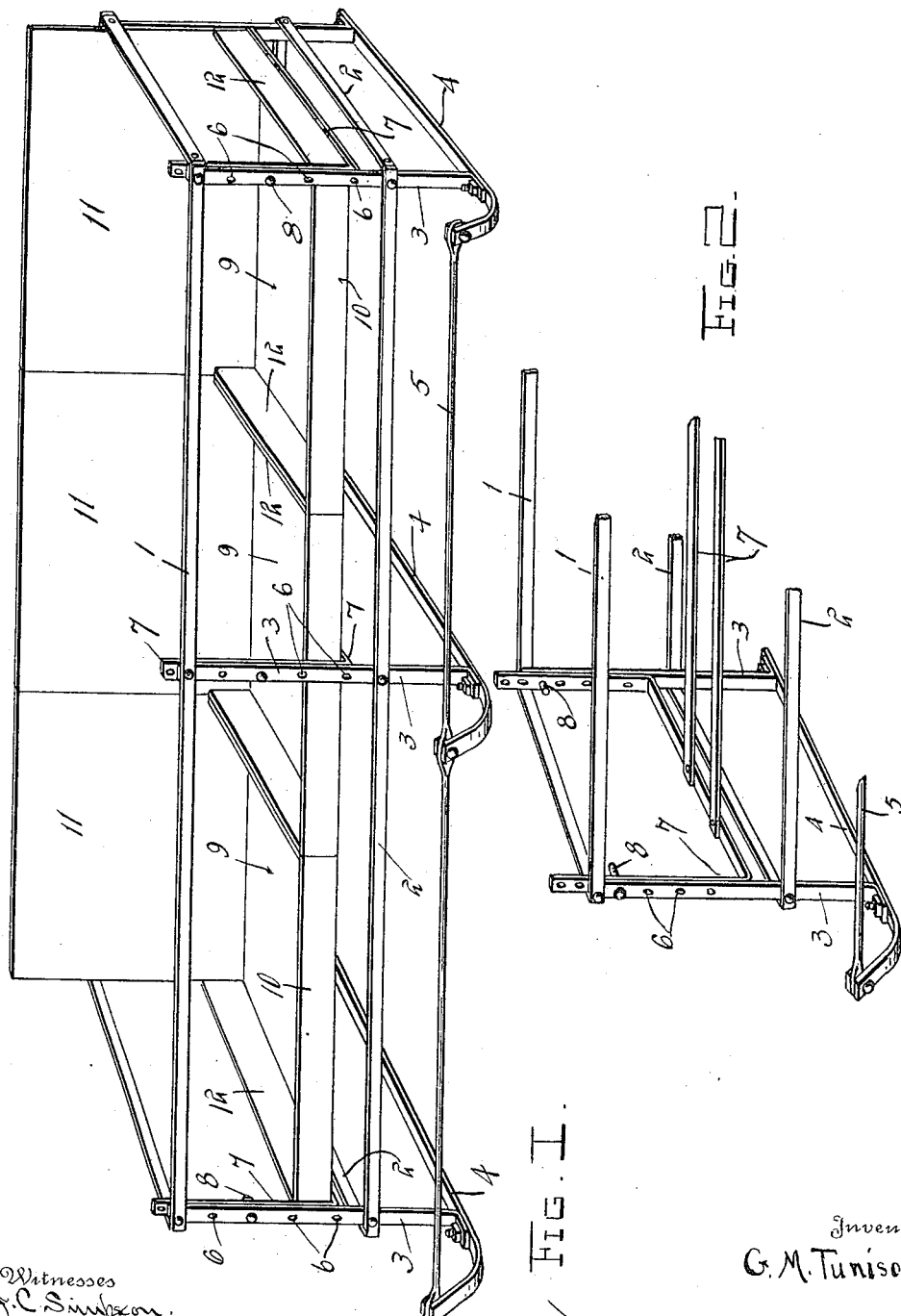

GARRETT M. TUNISON, OF RED CLOUD, NEBRASKA.

INSECT-CATCHER.

1,144,450.  Specification of Letters Patent.  Patented June 29, 1915.

Application filed July 13, 1914. Serial No. 850,714.

*To all whom it may concern:*

Be it known that I, GARRETT M. TUNISON, a citizen of the United States, residing at Red Cloud, in the county of Webster, State of Nebraska, have invented certain new and useful Improvements in Insect-Catchers; and I do hereby declare the following to be a full, clear, and exact description of the invention, such as will enable others skilled in the art to which it appertains to make and use the same.

This invention relates to an insect catcher.

An object of the invention is to provide a machine which will effectively collect the insects from a field.

A further object of the invention is to so construct the machine that the insect receiving pans may be adjustable vertically so that the machine may be used in fields where grasses or plants of various heights are growing without injuring the said grasses or plants.

A still further object of the invention is to provide means for killing the insects after they have been caught.

With these and other objects in view, such as will appear as the description progresses, my invention comprises the combination and arrangement of parts as herein set forth and subsequently claimed.

Referring to the drawing: Figure 1 is a perspective view of my device showing the pans in place thereon. Fig. 2 is a similar view with the pans removed showing the adjustable supporting brackets.

Referring to the drawing wherein like parts are indicated by like characters throughout the several views, my device comprises a rectangular upper frame 1 formed of strip metal or other suitable material and a similarly formed lower frame 2. These frames are positively held in predetermined spaced relation by vertically extending standards 3 which are secured at their upper ends to the upper frame 1 and adjacent their lower ends to the lower frame 2. These standards extend downwardly beyond the lower frame 2 and has secured to the lower ends thereof a plurality of runners 4 which are curved upwardly at their forward ends to facilitate the movement of the device.

Attached to the forward ends of the runners 4 and extending transversely from one to the other is a pull bar 5 by means of which the device may be dragged across a field.

In each of the standards 3 is formed a plurality of spaced holes 6.

Extending between the end standards and the members of the middle standards 3 are adjustable supporting brackets 7 which may be adjusted to any desirable height on the standards 3 by inserting the bolts 8 carried by the ends of the said brackets through any one of the holes 6 in the standards. Removably mounted on these brackets 7 are receiver pans 9 which are rectangular in formation and made of metal or any other desirable material. The forward walls 10 of these pans 9 extend vertically as do the rear walls 11 but the said forward walls are of lesser width than the rear walls. These walls are connected by side walls 12. The pans 9 are so constructed that they will retain oil or any other material which will effectively kill insects which are thrown into the said pans.

When it is desired to rid a field of short grass or any sort of plant of insects therein the pans 9 are adjusted by means of the brackets 7 to their lowermost positions and the device dragged across the field by means of the drag bar 5. During the motion of the device the grass or plants are struck by the drag bar 5 and the insects thereon fly or jump upwardly and while they are in such positions the pans 9 are dragged beneath the same so that when they fall down they fall into the oil or other material in the said pans. Thus it may be seen that the insects are not only caught in the pans 9, but are also exterminated. When it is desired to rid a wheat field or a field of taller plants or grasses it is only necessary to adjust the brackets together with the pans 9 on the standards 3 so that the same will be located adjacent the top of the said standards. The advance of the device will then cause the insects on the top of the wheat or plants to be thrown into the pans 9 and killed.

By providing the standards 3 with a plurality of holes 6 the pans may be adjusted to any desirable height, the height being controlled by the height of the plants or grasses that are to be operated upon.

From the foregoing description it may be seen that I have provided a device which will effectively exterminate insects from a field.

I have provided pans secured to the device, which pans are adjustable vertically in order that they may be located at the proper points to effectively catch insects which have been knocked or jumped from the plants or grasses which are being operated upon.

While I have described a particular construction, I wish it to be understood that I do not wish to be limited to that particular construction, for it is obvious that numerous changes may be made within the scope of the invention as defined by the claims.

What is claimed is:—

1. In an insect exterminator, upper and lower spaced rectangular frames, vertical standards connecting said frames and having a plurality of holes therein, runners on the lower ends of said standards, supporting brackets adjustably mounted on the standards, bolts connected to the supporting brackets and arranged to extend through any one of the aforementioned holes, pans removably supported on the said brackets, and a drag bar secured to the forward ends of the runners.

2. In a device of the class described, a rectangular frame, standards secured to said frame and extending downwardly therefrom, runners on the lower ends of said standards, brackets extending between standards and adjustably mounted thereon, pans supported by said brackets, and means in the pans for exterminating insects.

In testimony whereof, I affix my signature in the presence of two witnesses.

GARRETT M. TUNISON.

Witnesses:
P. A. WULLBRANDT,
J. E. BETZ.

Copies of this patent may be obtained for five cents each, by addressing the "Commissioner of Patents, Washington, D. C."